C. H. VEEDER.
TACHOMETER.
APPLICATION FILED MAY 3, 1911.
1,025,342.
Patented May 7, 1912.
2 SHEETS—SHEET 2.
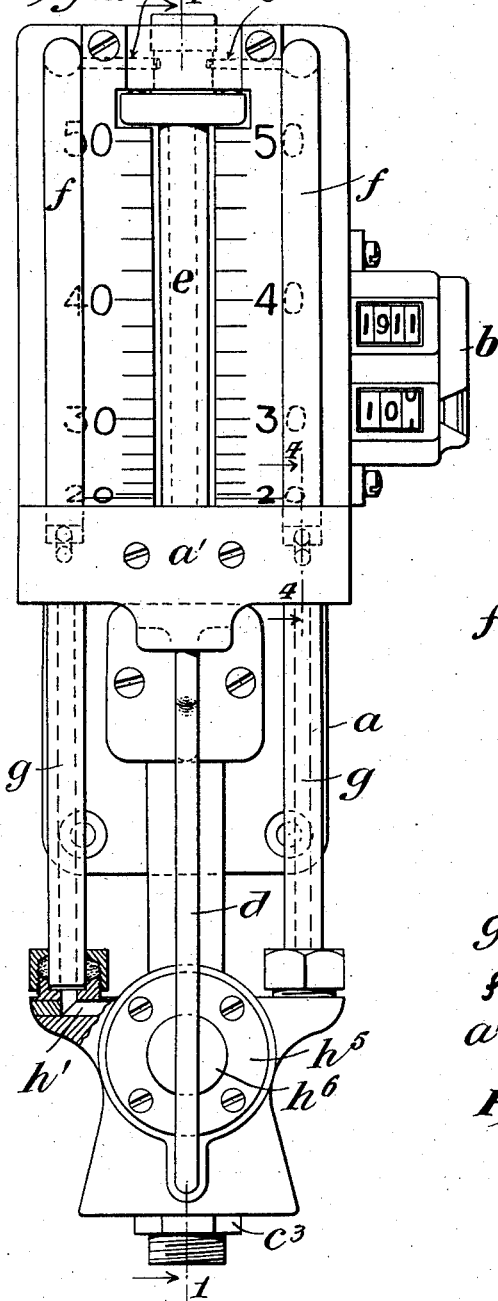
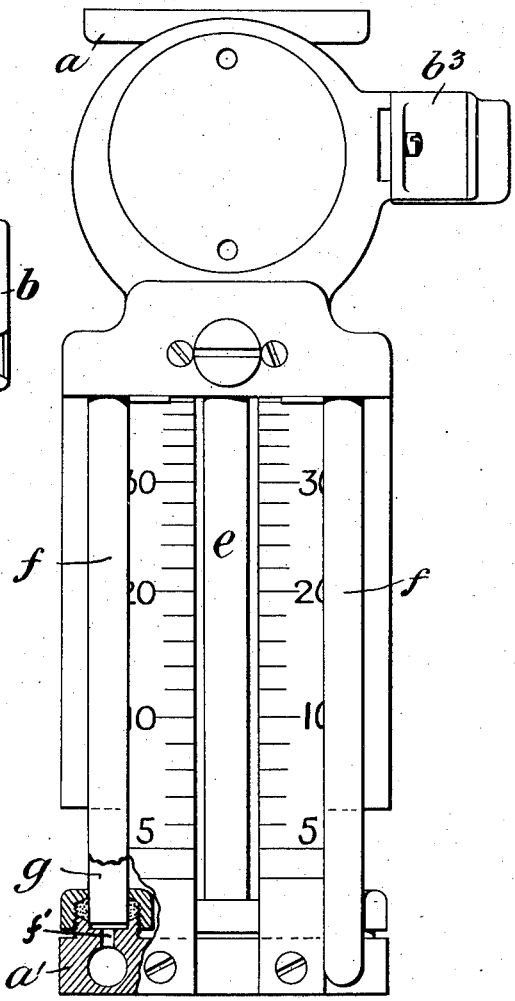
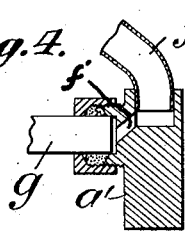
Attest:
Inventor:
by Curtis Hussey Veeder
Redding, Greeley & Austin
Attys

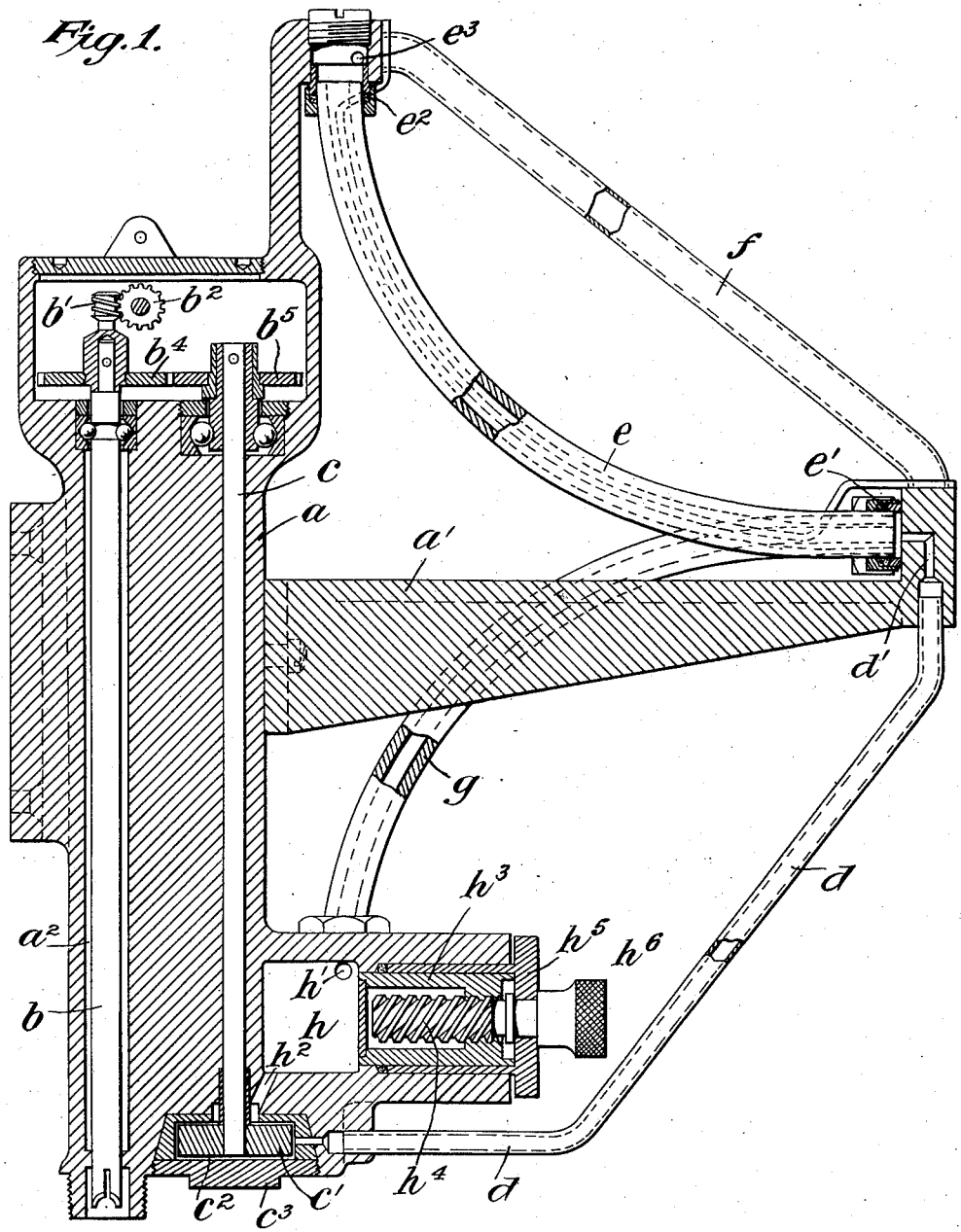

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

TACHOMETER.

1,025,342.     Specification of Letters Patent.     Patented May 7, 1912.

Application filed May 3, 1911. Serial No. 624,874.

*To all whom it may concern:*

Be it known that I, CURTIS HUSSEY VEEDER, a citizen of the United States, residing in the city of Hartford, in the State of Connecticut, have invented certain new and useful Improvements in Tachometers, of which the following is a specification, reference being had to the accompanying drawings, forming a part hereof.

In the ordinary liquid tachometer, in which a pump, driven at a speed in substantially constant ratio with the speed of the moving vehicle, acts upon a body of liquid to cause it to rise more or less in a straight indicating tube, the graduations of the scale adjacent to the indicating tube necessarily are not uniform, being much closer together for relatively low speeds than for relatively higher speeds. It is, therefore, somewhat difficult to read low speeds accurately. For the ordinary automobile this is not a serious matter, but for locomotives, for example, it is sometimes desirable that the indication of low speeds may be read accurately as well as the indication of high speeds. It has been proposed heretofore to meet this requirement by providing indicator tubes which are curved, generally with an elliptical curvature, but it has been found that tachometers with curved tubes, as heretofore constructed, are more or less sensitive to external disturbing forces, so that the accuracy of the indications, at low speed, is affected by acceleration and retardation of the instrument as a whole, as in the starting and the stopping of an automobile, and by the tipping of the instrument from its ordinary, vertical position in one direction or another. This sensitiveness of the tachometer to external disturbing forces is due largely to the fact that the center of gravity of the free surface of the liquid in the reservoir or reservoirs is not under the free surface of the liquid in the indicator tube, except possibly at one position. In accordance with the present invention, however, this difficulty is overcome by the provision of curved reservoir tubes in which the free surface of the liquid recedes as the free surface of the liquid in the indicator tubes rises so that the center of gravity of the free surfaces of the liquid in the reservoirs is at all times and under practically all conditions vertically below the center of gravity of the free surface of the liquid in the indicator and the bodies of liquid in the reservoirs and in the tube are therefore affected alike by the external forces.

The invention will be more fully explained hereinafter with reference to the accompanying drawings in which a convenient and practical embodiment thereof is illustrated and in which—

Figure 1 is a view in vertical section on the plane indicated by the line 1—1 of Fig. 2, with the tubes in elevation, showing a tachometer of suitable form which embodies the invention. Fig. 2 is a front view of the same, partly broken out to show a detail of the connections. Fig. 3 is a top view of the same, also partly broken out to show a detail of connections. Fig. 4 is a detail view of one of the connections.

In the embodiment of the invention shown in the drawings the several parts of the tachometer are supported upon a suitable bracket $a$, which may be secured to the vehicle at any point convenient for observation and is provided with a bracket arm $a'$. As the chamber of the pump which acts upon the liquid is located at the lower end of the bracket $a$ and as it is undesirable to have the pump shaft subjected to the friction of a stuffing box, as would be the case if the pump shaft were projected upward through the bottom of the pump chamber, the bracket $a$ is provided with a chamber $a^2$ in which is mounted, in suitable bearings, a vertical shaft $b$ to which the usual driving mechanism may be connected at the lower end. At the upper end the shaft $b$ may be provided with a worm $b'$ to engage a worm wheel $b^2$ on the shaft of the usual register shown at $b^3$, and is also provided with a gear $b^4$ which meshes with a corresponding gear $b^5$ on a vertical pump shaft $c$ which is likewise mounted in suitable bearings in the bracket and carries at its lower end a paddle wheel $c'$, which may be of any usual or suitable construction. The paddle wheel $c'$ of the pump is mounted in a chamber $c^2$, which is formed or located at the lower end of the bracket $a$ and has its bottom closed by an imperforate plate $c^3$. As the pump is thus driven from above its shaft rotates freely in its bearings and the necessity of providing a stuffing box is avoided. A pipe $d$ leads from the pump chamber $c^2$ to the curved indicator tube $e$, through a duct $d'$ formed in the end of the bracket arm $a'$, which supports the upper and outer end of the pipe $d$ and the lower outer end of the indicator tube $e$. At its upper and lower ends, the indicator tube is received in suitable stuffing boxes $e'$ and $e^2$. At its upper end the indicator tube communicates, through channels $e^3$, indicated by dotted lines in Fig. 3, with two straight, inclined tubes $f$, $f$, one at each side of the vertical plane of the indicator tube, which are supported by the bracket at their upper and lower ends, and at their lower ends communicate, as indicated at $f'$ in Figs. 3 and 4, with the upper ends of the reservoir tubes $g$, which are similarly placed, one at each side of the vertical plane of the indicator tube and below the same, and have substantially the same curvature as the indicator tube $e$ but in a reverse direction. At their lower ends the curved reservoir tubes $g$ communicate, through ducts $h'$, with a reservoir chamber $h$, which in turn communicates with the pump chamber through a duct $h^2$ and also receives the adjustable displacement plunger $h^3$ which is provided, as is usual in devices of this character, for the purpose of regulating the height of the liquid, and may be formed or located as most convenient. In this instance, the plunger $h^3$ is shown as engaged by a screw $h^4$ which is carried by a cap $h^5$ and is provided, externally, with a knob $h^6$ for convenient manipulation.

It will now be seen that in the operation of the improved tachometer the liquid, received from the reservoir tubes $g$, through the interposed regulating chamber, is driven through the pipe $d$ into the indicator tube $e$ in which its free surface will stand at a height which is dependent upon the speed at which the pump is driven so that the speed of the vehicle may be read off upon the scale $i$ which is adjacent to the indicator tube $e$. It being premised that for zero speed the liquid stands at such a height that it enters the lower end of the indicator tube and the upper ends of the reservoir tubes, it will be seen that as, with an increasing speed of the pump, the free surface of the liquid rises in the indicator tube it descends correspondingly in the reservoir tubes, the internal area in cross section of the indicator tube $e$ being equal to the combined areas in cross section of the reservoir tubes $g$. The free surface of the liquid in the indicator tube is therefore at all times vertically above the center of gravity of the free surfaces of the liquid in the reservoir tubes, whether the instrument be tipped in one direction or another and also regardless of the acceleration or retardation of the instrument as a whole.

Obviously the advantages of the improved instrument would be realized to some degree if a single, curved reservoir tube were employed and were placed directly below the curved indicator tubes, although, in the case of inclination laterally the center of gravity of the free surface of the liquid in the indicator tube would not be vertically above the center of gravity of the free surface of the liquid in the single reservoir tube. It will also be obvious that various other changes in the details of construction and arrangement of the parts may be made to suit different conditions of use without departing from the spirit of the invention.

I claim as my invention:

1. In an instrument of the character described, the combination of a pump, a curved indicator tube having a connection to the pump, and a similarly curved reservoir tube having a connection at one end to the indicator tube and at the other end to the pump.

2. In an instrument of the character described, the combination of a pump, a curved indicator tube having a connection to the pump, and two tubes similarly but reversely curved with respect to the indicator tube having connection at one end with the indicator tube and at the other end with the pump and placed one at each side of the vertical plane of the indicator tube and below the indicator tube.

3. In an instrument of the character described, the combination of a pump, a curved indicator tube having a connection to the pump, a similarly but reversely curved reservoir tube having connections at its upper end to the indicator tube, and a regulating reservoir having connections with the other end of the indicator tube and with the pump.

4. In an instrument of the character described, the combination of a pump, a curved indicator tube having a connection to the pump, two curved reservoir tubes having connections at one end to the indicator tube and placed on opposite sides of the vertical plane of the indicator tube and below the indicator tube, and a regulating reservoir having connections with the other ends of the reservoir tubes and with the pump.

5. In an instrument of the character described, the combination of a supporting bracket having an extended arm, a pump located at the lower end of the supporting bracket, a regulating reservoir also located at the lower end of the supporting bracket and having connections with the pump, an inclined indicator tube supported at its lower, outer end by the bracket arm and at its upper, inner end by the supporting bracket, a pipe connecting the pump with the lower, outer end of the indicator tube, and connections from the upper end of the indicator tube to the regulating reservoir.

6. In an instrument of the character described, the combination of a supporting bracket having an extended arm, a pump located at the lower end of the supporting bracket, a regulating reservoir also located at the lower end of the supporting bracket and having connections with the pump, an inclined indicator tube supported at its lower, outer end by the bracket arm and at its upper, inner end by the supporting bracket, a pipe connecting the pump with the lower, outer end of the indicator tube, a tube having connections with the upper end of the indicator tube and extended to the outer end of the bracket arm, and a reservoir tube communicating with the lower end of the last named tube at the outer end of the bracket arm and at its other end with the regulating reservoir.

7. In an instrument of the character described, the combination of a supporting bracket having a supporting arm extended therefrom, a pump located at the lower end of the supporting bracket, a curved indicator tube supported at its lower, outer end upon the bracket arm and at its upper, inner end upon the supporting bracket, a curved reservoir tube supported at its upper, outer end under the bracket arm and at its lower, inner end upon the supporting bracket and communicating with the pump, a tube connecting the pump with the lower, outer end of the indicator tube and a tube connecting the upper end of the indicator tube with the upper end of the reservoir tube.

8. In an instrument of the character described, the combination of a supporting bracket having a supporting arm extended therefrom, a pump located at the lower end of the supporting bracket, a curved indicator tube supported at its lower, outer end upon the bracket arm and at its upper, inner end upon the supporting bracket, two curved reservoir tubes supported at their upper, outer ends under the bracket arm and at their lower, inner ends upon the supporting bracket and communicating with the pump, said reservoir tubes being located one at each side of the vertical plane of the indicator tube and below the indicator tube, two tubes connecting the upper end of the indicator tube with the upper end of the reservoir tubes.

This specification signed and witnessed this 26th day of April A. D., 1911.

CURTIS HUSSEY VEEDER.

Signed in the presence of—
 AMASA TROWBRIDGE,
 CHARLES G. ALLYN.

---

Copies of this patent may be obtained for five cents each, by addressing the "Commissioner of Patents, Washington, D. C."